W. W. LILES.
CHURN DASHER.
APPLICATION FILED OCT. 20, 1910.
980,107.
Patented Dec. 27, 1910.
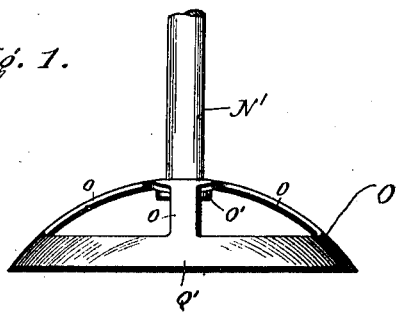
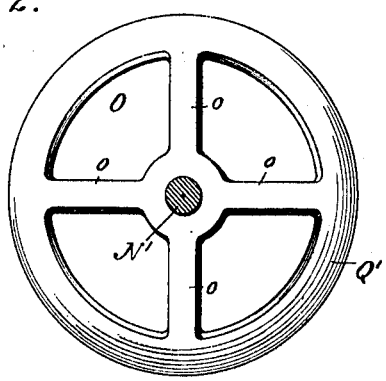
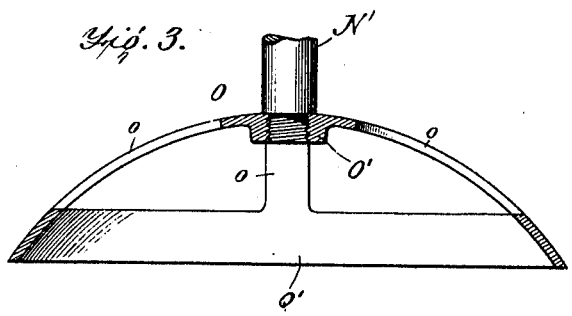
WITNESSES:
L. H. Schmidt.
J. S. Brock.
INVENTOR
WILLIAM W. LILES,
BY Munn & Co.
ATTORNEYS

UNITED STATES PATENT OFFICE.

WILLIAM W. LILES, OF MINERAL WELLS, TEXAS.

CHURN-DASHER.

980,107.  Specification of Letters Patent.  Patented Dec. 27, 1910.

Original application filed December 31, 1909, Serial No. 535,738. Divided and this application filed October 20, 1910. Serial No. 588,218.

*To all whom it may concern:*

Be it known that I, WILLIAM W. LILES, a citizen of the United States, and a resident of Mineral Wells, county of Palo Pinto, and State of Texas, have invented certain new and useful Improvements in Churn-Dashers, of which the following is a specification.

My invention relates to dashers used in churning cream into butter, the present invention being a division of my copending application filed December 31, 1909, Serial No. 535,738, its object being to provide a dasher which shall churn the butter in a simple, cheap and efficient manner.

My invention consists in certain novel features and constructions as will be hereinafter fully described and pointed out in the claim, reference being had to the accompanying drawings, in which—

Figure 1 is a side elevation. Fig. 2 is a top plan view, and Fig. 3 is an enlarged vertical section.

In carrying out my invention, I attach the dasher shaft N' to the dasher head or beater O, which is dished or concavo-convex as shown, said dasher shaft being secured to said dasher head by screwing the lower end into an internally threaded thimble or socket O' suitably secured to said head. The lower rim Q' of the dasher head projects downwardly on an incline, and is connected to the main portion of the dasher head by the flat spiders or spokes o, thus leaving spaces between the rim Q' and the upper portion O.

By making the dash-head convex on top and concave underneath, the downward movement of the dasher will force the cream to the center and the upward movement of the dasher will then force the cream outwardly, this alternate forcing of the cream toward the center and then outwardly, facilitating the operation of churning.

I claim:

In a churning device the combination with a reciprocating dasher shaft, of a concavo-convex dasher-head, consisting of lower annular band or rim disposed obliquely, a concavo-convex central hub, and curved spiders or spokes connecting said hub and rim.

WILLIAM W. LILES.

Witnesses:
A. E. TANNER,
H. B. BARKER.